US012592609B2

(12) United States Patent
Kunst

(10) Patent No.: US 12,592,609 B2
(45) Date of Patent: Mar. 31, 2026

(54) ELECTROMOTIVE DRIVE UNIT FOR MOTOR VEHICLE APPLICATIONS

(71) Applicant: KIEKERT AG, Heiligenhaus (DE)

(72) Inventor: Frank Kunst, Lüdinghausen (DE)

(73) Assignee: KIEKERT AG, Heiligenhaus (DE)

( * ) Notice: Subject to any disclaimer, the term of this patent is extended or adjusted under 35 U.S.C. 154(b) by 378 days.

(21) Appl. No.: 18/264,950

(22) PCT Filed: Jan. 26, 2022

(86) PCT No.: PCT/DE2022/100065
§ 371 (c)(1),
(2) Date: Aug. 10, 2023

(87) PCT Pub. No.: WO2022/171233
PCT Pub. Date: Aug. 18, 2022

(65) Prior Publication Data
US 2024/0125153 A1 Apr. 18, 2024

(30) Foreign Application Priority Data

Feb. 15, 2021 (DE) ..................... 10 2021 103 444.2

(51) Int. Cl.
*H02K 7/00* (2006.01)
*E05B 81/06* (2014.01)
(Continued)

(52) U.S. Cl.
CPC ............. *H02K 7/003* (2013.01); *E05B 81/06* (2013.01); *E05B 81/34* (2013.01); *F16D 1/104* (2013.01);
(Continued)

(58) Field of Classification Search
CPC .......... E05B 81/06; E05B 81/14; E05B 81/34; F16D 1/101; F16D 1/104;
(Continued)

(56) References Cited

U.S. PATENT DOCUMENTS 2,826,903 A * 3/1958 Gerstung ................ F16D 7/048
464/37
3,994,608 A * 11/1976 Swiderski ............. F16D 1/0835
403/372
(Continued)

FOREIGN PATENT DOCUMENTS

DE 10360419 A1 * 7/2005 ........... H02K 7/1166
DE 102006015695 A1 10/2007
(Continued)

OTHER PUBLICATIONS

International Search Report mailed May 10, 2022, for priority International Application No. PCT/DE2022/100065.

*Primary Examiner* — Josh Skroupa
(74) *Attorney, Agent, or Firm* — Renner, Otto, Boisselle & Sklar, LLP.

(57) ABSTRACT

An electric motor drive unit for motor vehicle applications, which is equipped with an electric motor having an output shaft substantially circular in cross-section and with a drive element mounted on the output shaft, preferably made of plastic. The output shaft engages a receiving hole of the drive element defining at least one vent hole. According to the invention, the output shaft has, in one variant, at least in the engagement area of the receiving bore, two ridges that are spaced apart from one another and extend axially. A protrusion of the drive element engages between the ridges for rotational coupling. Furthermore, the two ridges each describe a vent hole on the outer edge.

13 Claims, 3 Drawing Sheets

(51) Int. Cl.

| | | |
|---|---|---|
| *E05B 81/34* | (2014.01) | |
| *F16D 1/104* | (2006.01) | |
| *H02K 7/116* | (2006.01) | |

(52) U.S. Cl.
CPC ......... *H02K 7/116* (2013.01); *Y10T 403/7018* (2015.01)

(58) Field of Classification Search
CPC ......... F16D 2001/102; F16D 2300/021; F16D 2300/0212; Y10T 403/7018; Y10T 403/7026; Y10T 403/7035; Y10T 403/7093
USPC .............. 464/17; 403/355, 359.1, 359.6, 383
See application file for complete search history.

(56) References Cited

U.S. PATENT DOCUMENTS

| | | | |
|---|---|---|---|
| 7,070,357 B2 * | 7/2006 | Giese ...................... | F16D 1/101 403/355 |
| 2005/0276659 A1 | 12/2005 | Giese et al. | |

FOREIGN PATENT DOCUMENTS

| | | | |
|---|---|---|---|
| DE | 102009036834 A1 | 2/2011 | |
| DE | 102011089083 A1 | 6/2013 | |
| DE | 102013010461 A1 | 12/2014 | |
| DE | 102014202909 A1 * | 8/2015 | ........... F16D 1/0858 |
| DE | 102015102137 A1 | 8/2016 | |
| EP | 0794337 A1 | 9/1997 | |
| IT | TO20100019 A1 | 7/2011 | |
| JP | 2005265169 A | 9/2005 | |
| WO | WO-2006075364 A1 * | 7/2006 | .......... F04C 15/0073 |

* cited by examiner

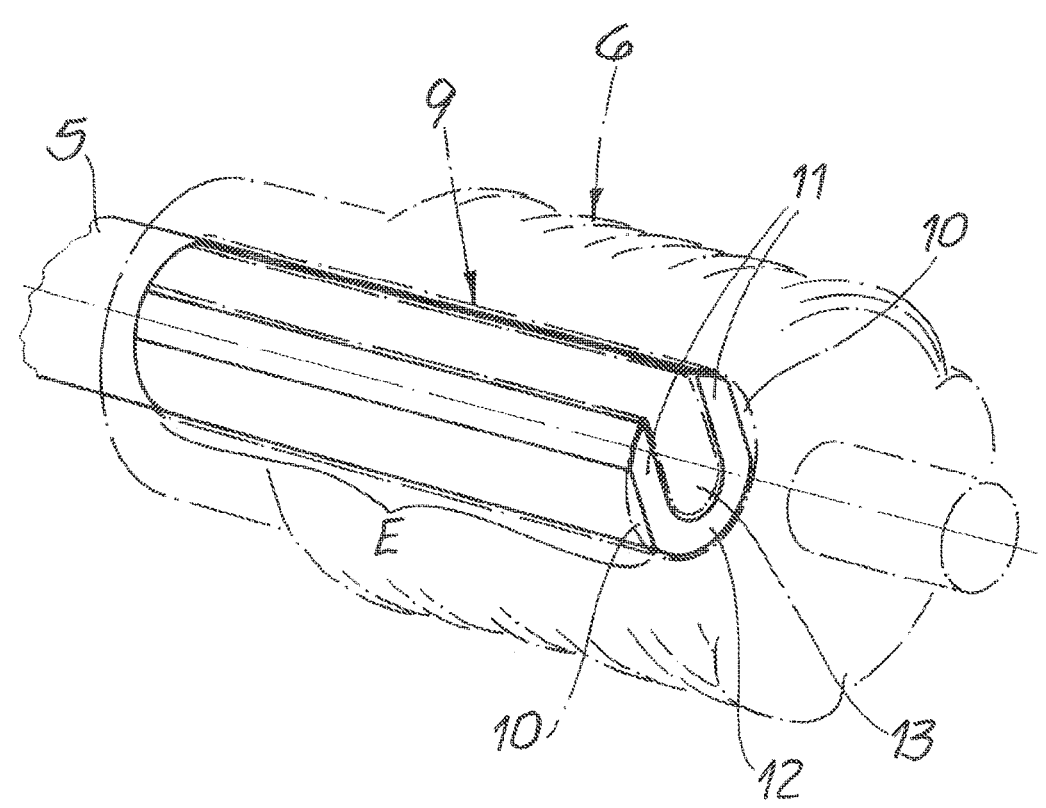
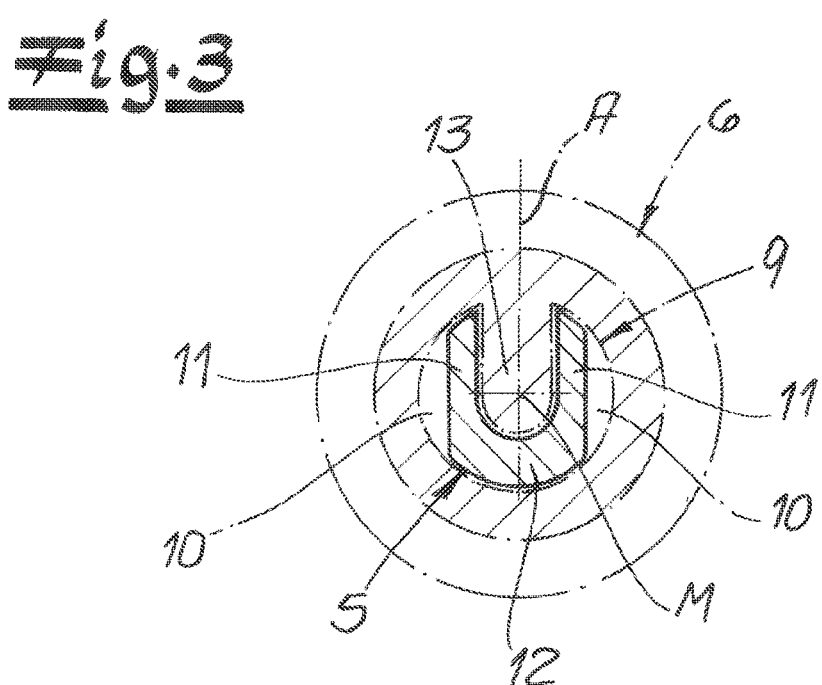

ELECTROMOTIVE DRIVE UNIT FOR MOTOR VEHICLE APPLICATIONS

This application is a national phase of International Patent Application No. PCT/DE2022/100065 filed Jan. 26, 2022, which claims priority to German Patent Application No. 10 2021 103 444.2 filed Feb. 15, 2021, each of which is hereby incorporated herein by reference in its entirety.

FIELD OF DISCLOSURE

The invention relates to an electric motor drive unit for motor vehicle applications, having an electric motor with a substantially circular output shaft in cross-section, and having a drive element mounted on the output shaft, preferably made of plastic, for example as a component of a gearbox, wherein the output shaft engages in a receiving bore of the drive element, defining at least one vent bore.

BACKGROUND OF DISCLOSURE

Such electric motor drive units for motor vehicle applications are used, for example and not restrictively, as actuators in or on motor vehicle locks, for adjusting motor vehicle seats, headlights, mirrors or also in connection with window regulators. Consequently, the electric motor of the relevant electromotive drive unit is typically operated with a low DC voltage of 12 V, 24 V or even 48 V. In order to be able to realize and convert actuating movements, which can nevertheless be power-consuming, rotary movements of the high-speed output shaft of the electric motor are translated with the aid of the gearbox, which is usually provided and connected downstream and to which the drive element usually belongs. The drive element as such can be a worm, for example, which together with a worm wheel forms and defines the gearbox referred to. Such worm gears are generally known in connection with motor vehicle applications, for which reference is made only by way of example to DE 10 2009 036 834 A1 or also 103 60 419 A1.

Since relatively high forces are transmitted in part by the gearbox or drive element, the connection between the output shaft and the receiving bore of the drive element (made of plastic) is of particular importance. In fact, output shafts that have a D-shape cross-section have proven favorable here. Such an embodiment is also referred to as a D-Cut, as explained, among others, in DE 10 2013 010 461 A1. In fact, at this location the output shaft is equipped with at least one recess in the form of a groove. The drive element in the form of a worm or worm wheel with a protrusion engages in the groove, creating a form closure.

The groove extends parallel to the axis of rotation of the output shaft. As a rule, even three grooves are realized in the output shaft, which extend in parallel. The worm wheel or worm as a plastic drive element engages in the grooves in question with the help of three protrusions. In this manner, higher forces can also be transmitted overall if the worm or worm wheel is made of plastic. This is also intended to prevent the output shaft from peeling into the plastic drive element or worm wheel during actuation.

In the genus-forming prior art according to JP 2005-265169, the electromotive drive unit is used in connection with a CD player mounted inside a motor vehicle. In order to provide not only a perfect connection between the metal output shaft and the plastic worm at this location, but also to absorb temperature-related deformations of the worm or worm wheel, a venting hole is also provided. In this manner, any deformation of the plastic drive element or screw in the engagement area can be reliably prevented. This has proven itself in principle.

However, prior art allows for further improvements. For example, the vent holes in the type-forming teaching are relatively small, so that deformations in the drive element or the plastic screw are still possible during operation without any changes. Furthermore, in the known teaching, the coupling between the output shaft and the drive element is realized by an interference fit. Under certain circumstances, such an interference fit can shear off under high torque loads, or the output shaft can "peel" into the drive element in the engagement area as already described in DE 102013010461 A1. The invention as a whole seeks to remedy this.

SUMMARY OF DISCLOSURE

The invention is based on the technical problem of further developing such an electric motor drive unit for motor vehicle applications in such a manner that a perfect torsionally rigid coupling is provided without the risk of mechanical damage and, at the same time, any temperature effects occurring during operation are perfectly controlled.

In order to solve this technical problem, the invention proposes in a first variant of a generic electric motor drive unit for motor vehicle applications that the output shaft has, at least in the engagement region of the receiving bore, two spaced-apart and axially extended ridges with a chord-like cross section, between which a protrusion of the drive element engages for rotary coupling and which each describe or delimit a venting bore at the outer edge.

In the context of the invention, therefore, a special design of the output shaft comes into play at least in the engagement area of the receiving bore of the drive element. The drive element is generally a worm or worm wheel comparable to the embodiment described and illustrated in DE 10 2013 010 461 A1. Of course, other embodiments of the drive element are also possible and are comprised by the invention. The drive element is regularly made of plastic, but can also be metallic.

However, the two spaced-apart and axially extended ridges of the output shaft, which are realized at least in the engagement area of the receiving bore, are now decisive in the first instance. This is because these ridges extend chordally, i.e. along a circular chord of the output shaft, which is substantially circular in cross-section. This allows the two ridges, each extending along a circular chord, to be spaced apart and form a receptacle between them in which the protrusion of the drive element engages for rotational coupling. The two ridges can extend at an angle to one another. Usually, however, the two ridges are observed to extend parallel to one another.

In addition, it has proved useful in this context if the two ridges extend in the axial direction at equal distances from the center of the output shaft, which is substantially circular in cross-section. The chord-like extension of the ridges is further manifested in the fact that the ridges terminate at the head end at a circumference of the output shaft, which is substantially circular in cross-section. On the foot side, the two ridges can be connected by an arc. As a result, the two ridges together with the arc form a compound U-bridge.

The protrusion on the drive element now engages in this U-shaped ridge of the output shaft in the engagement area of the receiving bore. As a rule, this is done by friction locking to realize the slewing ring and usually even by force and form closure. Accordingly, the protrusion has a shape complementary to the U-shaped ridge or receptacle formed inside, in the form of a U-shaped protrusion. In this manner, a particularly secure rotational coupling is provided between, on the one hand, the U-shaped projection on the drive element and, on the other hand, the U-shaped design of the output shaft in the receiving area.

In addition, a vent hole is described on the outer edge of each of the two ridges or the U-legs of the U-bridge in this way and, as it were, inevitably. This vent hole is set practically automatically, namely starting from the outer edge of the respective ridge to the inner edge of the receiving bore in the engagement area that receives the output shaft or the U-shaped ridge extending in the axial direction. These two vent holes formed at the outer edge of the ridges are generally designed to be circular in cross-section. In addition, the two vent holes usually have the same size in cross-section. In addition, the vent holes are regularly arranged in mirror symmetry to an axis extending through the center of the output shaft, which is substantially circular in cross-section.

The fact that the vent holes each start from the edge of the U-shaped ridge or its two U-shaped legs means that any temperature-related changes in the diameter of the receiving bore can be easily accommodated and compensated for. This also prevents possible cracks inside the plastic drive element. Shearing and peeling of the output shaft into the receiving bore is also avoided. As a result, long service lives of the electromotive drive unit according to the invention can be expected, as well as flawless functionality over the entire service life, even under high loads.

Comparable vent holes are also observed in another second variation of the invention. This provides that in a generic drive unit the output shaft has, at least in the engagement area of the receiving bore, a D-shaped extension with vent holes in each case on the outer wall. The vent holes can be of similar design as before and offer similar advantages.

In fact, for example, thermoplastic materials are typically used to realize the drive element or the screw usually used at this location, such as PMMA (polymethyl methacrylate), PA (polyamide), PBT (polybutylene terephthalate), POM (polyoxymethylene) or even PC (polycarbonate). Such plastics are particularly easy to process and also have sufficient hardness for power transmission in connection with a gearbox constructed from them or when the usually realized worm meshes with an associated worm wheel. The use of polyamide (PA), i.e. PA 66, a special homopolyamide, has proved particularly favorable at this location.

It is also a subject matter of the invention to provide a motor vehicle lock and, in particular, a motor vehicle door lock which is advantageously equipped with an electromotive drive unit of the design described at the beginning. In this context, the drive unit can be used to realize and implement individual functional positions such as "locked" or also "theft-proof". In addition, such electromotive drive units can be used and deployed as pulling devices in connection with motor vehicle locks. They can also be used and applied as locking drives in connection with locking actuators in electric charging devices for electric or hybrid motor vehicles.

In all of these locations, functional actuation is provided and temperature-related effects can be controlled particularly well. As a result, large forces can also be transmitted. Herein lie the essential advantages.

BRIEF DESCRIPTION OF DRAWINGS

The invention is explained in greater detail below with reference to a drawing which shows only one exemplary embodiment. In the drawing:

4

Figure 1:
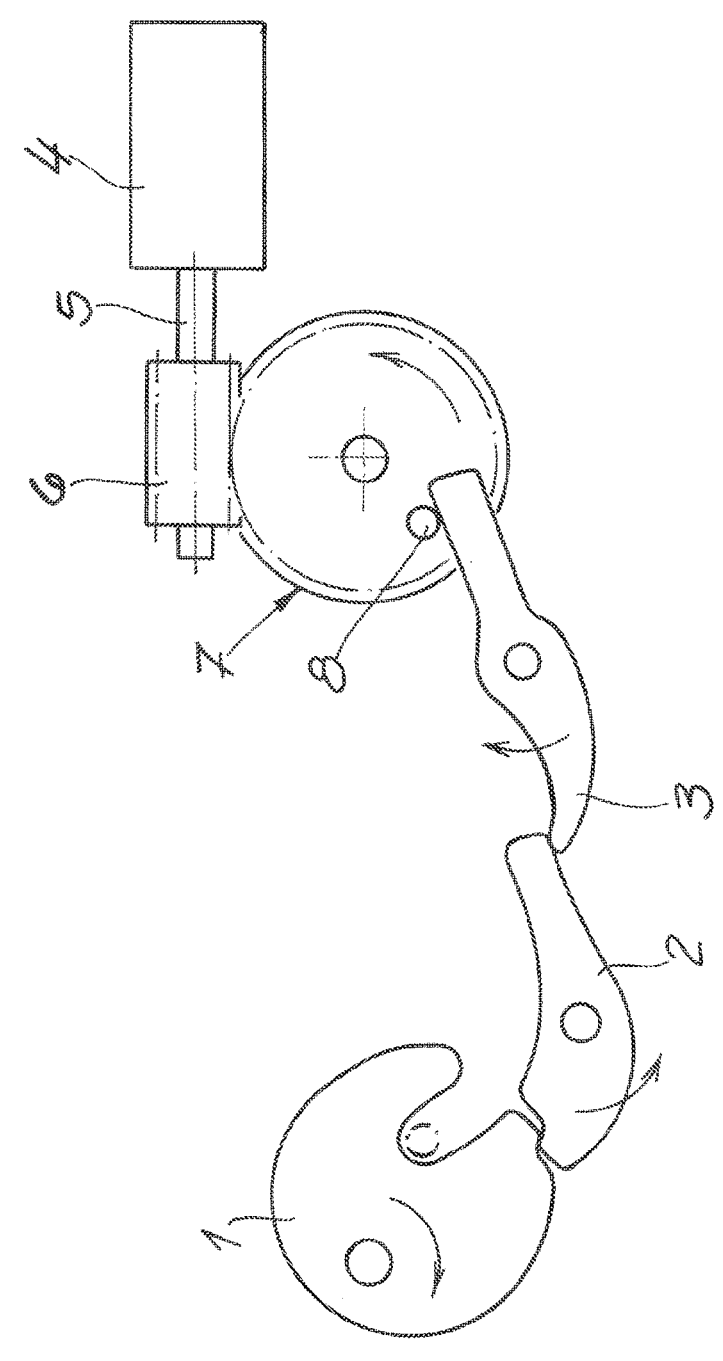
Figure 4:
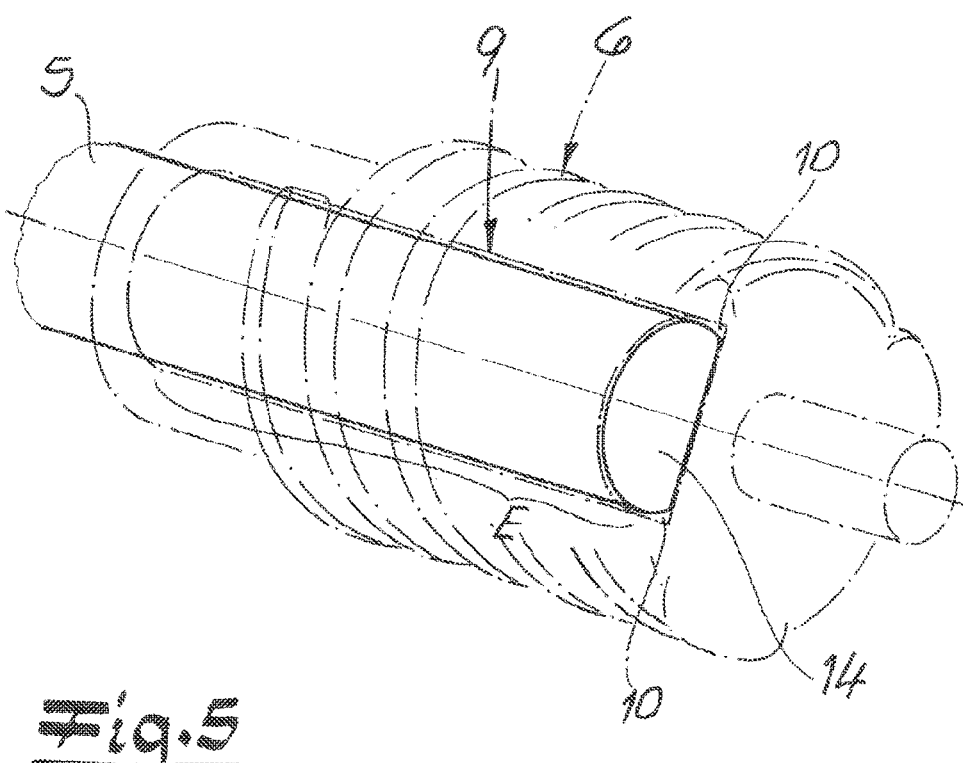
Figure 5:
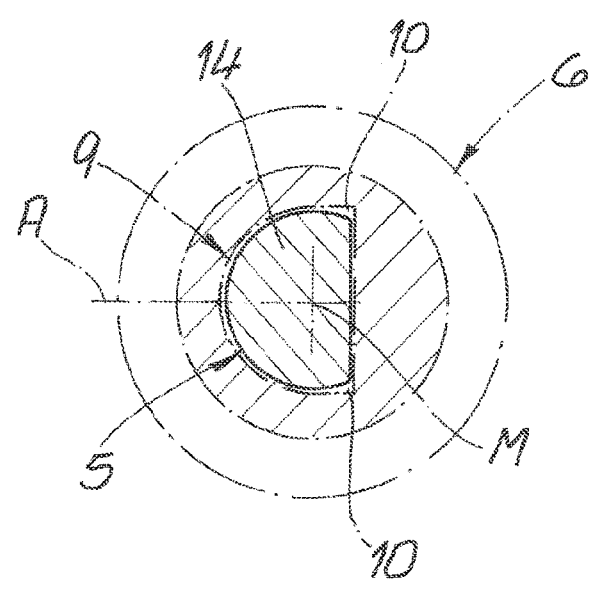

FIG. 1 shows schematically and exemplarily an electric motor drive unit for motor vehicle technical applications according to the invention, FIG. 2 shows the drive element designed as a worm in a perspective view, FIG. 3 shows a section through the subject matter shown in FIG. 2, FIG. 4 shows an alternative output shaft of the electric motor in perspective and FIG. 5 shows a section through the subject matter shown in FIG. 4.

DETAILED DESCRIPTION

The figures show a representation of an electric motor drive unit for automotive applications. In fact, in the context of the embodiment example, the electric motor drive unit is used in connection with a motor vehicle lock and in particular a motor vehicle door lock. In fact, within the scope of the embodiment example according to FIG. 1 and not restrictively, the electric motor drive unit is designed as an opening drive for a locking mechanism 1, 2 schematically shown there, consisting of a rotary latch 1 and a pawl 2. For this purpose, the electromotive drive unit operates on a release lever 3. To open the locking mechanism 1, 2, the release lever 3 is acted upon by means of the electric motor drive unit such that the release lever 3 pivots about its axis in a clockwise direction.

The clockwise movement of the release lever 3 results in the release lever 3 engaging the locking mechanism 1 which is in the closed position, 2 engaged with the rotary latch 1 pivots about its axis 2 in a counterclockwise direction. This releases the rotary latch 1 and in turn allows it to swing open about its axis in a clockwise direction, releasing a previously captured locking bolt that is not explicitly shown. The same applies to a motor vehicle door carrying the locking bolt and not specifically illustrated.

For this purpose, the electromotive drive unit according to the invention has an electric motor 4 and an output shaft 5 which is substantially circular in cross-section, is provided on the output side of the electric motor 4 and is set into high-speed rotations with its aid. A drive element 6 is mounted on the output shaft 5.

According to the embodiment example, the drive element 6 made of plastic is a worm 6, as shown in detail in the perspective representation according to FIGS. 2 and 4. The worm 6 or drive element 6 made of plastic meshes with a worm wheel 7 also made of plastic. The worm wheel 7 has an actuating pin 8. In this manner a gearbox 6, 7, 8 connected to the electric motor 4 is realized.

On the basis of FIG. 1, it can be understood that a counterclockwise movement of the worm wheel 7 causes the actuating pin 8 to act on the release lever 3 in the sense that the release lever 3 performs the clockwise movement about its axis described earlier. This lifts the pawl 2 from its engagement with the rotary latch 1 and effectively releases the motor vehicle door. Of course, the electric motor drive unit to be described in detail below can also be used for other purposes and applications as already described in the introduction.

On the basis of FIGS. 2 to 5, it is clear that the drive element or worm 6 made of plastic is not only a component of the gearbox 6, 7, 8. But the drive element or worm 6 is also mounted on the output shaft 5, according to the embodiment example, plugged onto the output shaft 5 and, if necessary, additionally axially secured thereon. This can be done, for example, by additionally applying adhesive or by other means.

For this purpose, the output shaft 5 engages a receiving bore 9 inside the drive element or worm 6. According to the exemplary embodiment, the receiving bore 9 is arranged in the center of the cylindrical screw 6 and extends in the axial direction.

On the basis of the schematic diagram in FIGS. 2 and 4, it can be seen that the output shaft 5 engages in the worm 6 as seen over a certain axial length, namely under definition of an engagement area E. Moreover, when the output shaft 5 engages the receiving bore 9 of the worm 6, bilateral vent holes 10 are defined, which can best be understood by reference to the representation in FIGS. 2 to 4.

In fact, according to the invention, the formation of the output shaft 5, which is substantially circular in cross-section, in the engagement region E of the receiving bore 9 of the worm 6 is substantially designed and pronounced in such a manner that at this location two ridge 11, which extend axially and are chord-like in cross-section, are realized in the first variant according to FIGS. 2 and 3 are realized. This is particularly clear from the sectional view in accordance with FIG. 3. In this sectional view, one can see a center point M of the output shaft, which is substantially circular in cross-section 5.

Relative to this midpoint M, the two ridges 11 extend along a circular chord. In this case, the two ridges 11 each end at the head end of the circumference of the relevant output shaft 5 and are connected to one another at the foot end by an arc 12. Thus the two ridges 11 in connection with the arc 12 describe a compound U-bridge 11, 12.

Furthermore, according to the embodiment, the two ridges 11 extend parallel to one another and are equally spaced from the center point M in question. A protrusion 13 of the drive element 6 engages between the two ridges 11. Thus, a rotary coupling or rotary connection between the output shaft 5 and the drive element 6 is realized and converted. Furthermore, the two ridges 11 on the outer edge each describe a vent hole 10. In fact, the ridge 11 acts as a boundary of the respective vent hole 10 along with an inner wall of the receiving bore 9.

The protrusion 13 generally engages the U-shaped ridge 11, 12 in a force and form closure. In fact, the protrusion 13 is complementary designed like the U-shaped protrusion 11, 12, is consequently designed as a U-shaped protrusion 13. The vent holes 10 are designed to be circular in cross-section. Furthermore, according to the embodiment example, the two vent holes 10 have the same cross-section and are incidentally arranged in mirror symmetry with respect to an axis A extending through the center M of the output shaft 5.

The drive element or worm 6 (and also the worm wheel 7) is generally made of a thermoplastic material. Plastics, such as polyamide and, in particular, homopolyamides, have proven particularly advantageous here. In contrast, the output shaft 5 of the electric motor 4 is usually metallic. To unite the worm 6 with the output shaft 5, the latter is pushed onto the output shaft 5 in such a manner that there is a form closure in the direction of rotation of the output shaft 5. The two ridges 11, resp. the U ridge 11, 12 in the engagement area E of the receiving bore 9 of the worm 6 is usually produced on the output shaft 5 by forming the output shaft 5.

Comparable advantages and effects are also observed for the second variant according to FIGS. 4 and 5. Here, the output shaft 5 engages in the engagement area E with a D-shaped extension 14 in the receiving bore 9. This again provides a torsional coupling to the screw 6. The vent holes 10 realized at the outer edge of the D-shaped extension 14 again provide for eventual cooling.

LIST OF REFERENCE SIGNS

| | | | |
|---|---|---|---|
| 1, 2. | Locking mechanism | 1 | Rotary latch |
| 3 | Release lever | 2 | Pawl |
| 4 | Electric motor | | |
| 5 | Output shaft | | |
| 6, 7, 8 | Drive element | 6 | Worm |
| | | 7 | Worm gear |
| | | 8 | Actuating pin |
| 9 | Receiving bore | | |
| 10 | Vent hole | | |
| 11, 12. | U-bridge | 11 | Webs |
| | | 12 | Arc |
| 13 | Protrusion | | |
| 14 | D-shaped extension | | |
| A | Axis | | |
| E | Engagement region | | |
| M | Midpoint | | |

The invention claimed is:

1. An electric motor drive unit for motor vehicle technical applications, the drive unit comprising:

an electric motor with an output shaft circular in cross-section, and a drive element mounted on the output shaft wherein the output shaft engages a receiving bore of the drive element, and wherein the output shaft has, at least in an engagement region of the receiving bore, two ridges which are spaced apart from one another, and extend axially and are chord-like in cross-section, between which a protrusion of the drive element engages for rotary coupling of the output shaft and the drive element, and each of the two ridges and an inner wall of the receiving bore defines a vent hole on an outer edge side of each of the two ridges, wherein the two ridges are connected to one another at a foot end by an arc to form a composite U-shaped ridge extending around at least a portion of a midpoint of the circular cross section of the output shaft, and wherein the protrusion of the drive element is inserted into the ridge.

2. The drive unit according to claim 1, wherein the two ridges extend parallel to one another.

3. The drive unit according to claim 1, wherein the two ridges extend in an axial direction at equal distances from the midpoint of the circular cross section of the output shaft.

4. The drive unit according to claim 1, wherein the two ridges terminate at a head end at a circumference of the output shaft.

5. The drive unit according to claim 1, wherein the protrusion engages the U-shaped ridge in a friction locking manner.

6. The drive unit according to claim 1, wherein the vent holes are formed as a circular-segment in cross section.

7. The drive unit according to claim 1, wherein the vent holes are of equal size in cross section.

8. The drive unit according to claim 1, wherein the vent holes are arranged in mirror symmetry with respect to an axis extending through a center of the circular cross section of the output shaft.

9. A motor vehicle lock comprising a drive unit according to claim 1 and a locking mechanism that is operated by the drive unit.

10. The drive unit according to claim 1, wherein the drive element is made of plastic.

11. The drive unit according to claim 1, wherein the drive element is made of plastic and the output shaft is made of metal.

12. The drive unit according to claim 1, wherein the drive element is a worm gear and/or a worm wheel.

13. The drive unit according to claim 1, wherein the protrusion has a complementary U-shape relative to the composite U-shaped ridge.

\* \* \* \* \*